No. 855,759. PATENTED JUNE 4, 1907.
J. C. DALRYMPLE.
DEVICE FOR MEASURING STANDING TIMBER.
APPLICATION FILED MAY 26, 1906.
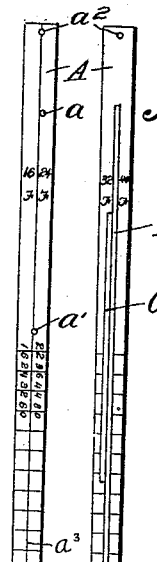
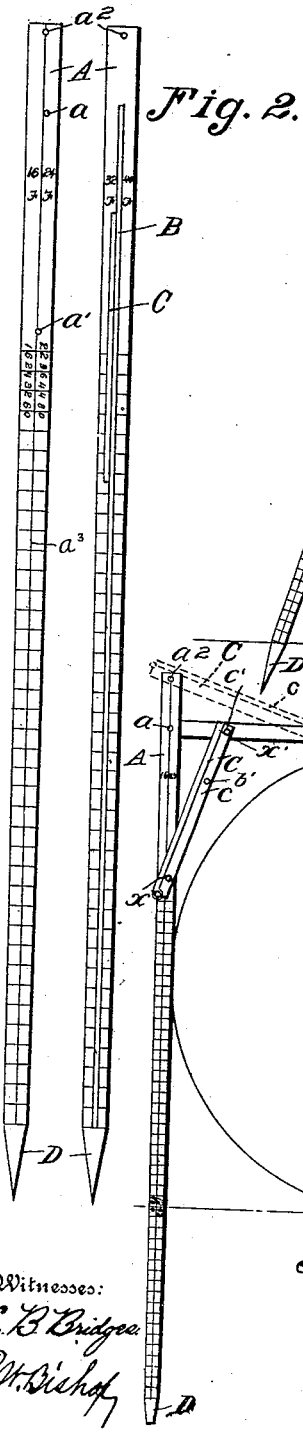
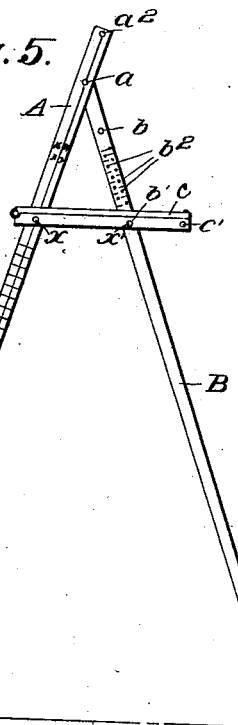
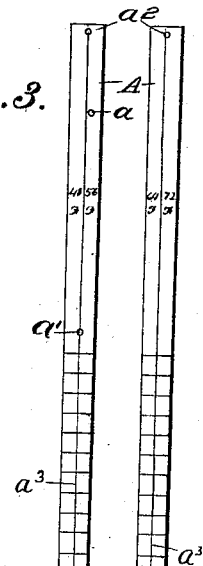
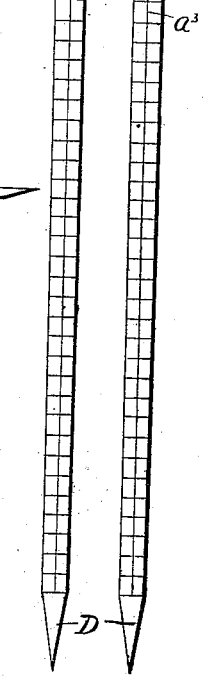
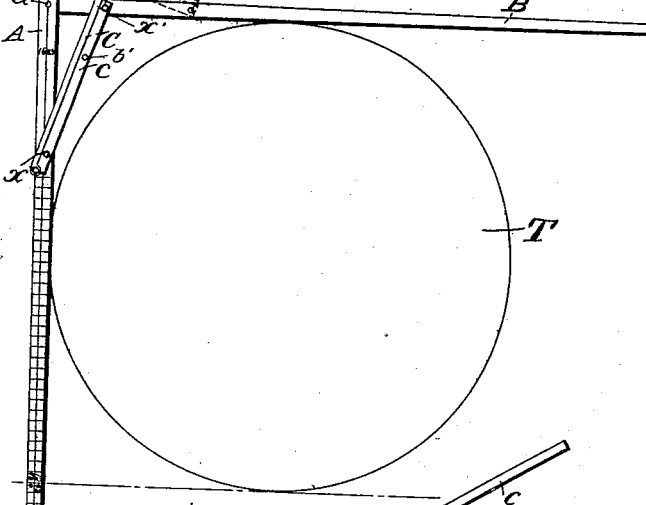
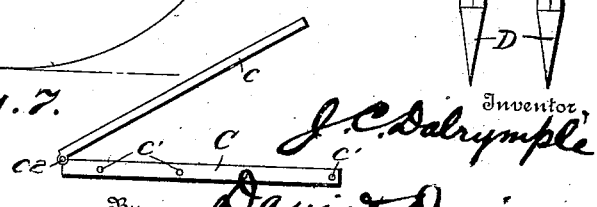
Witnesses:
L. B. Bridges
R. H. Bishop
Inventor
J. C. Dalrymple
By Davis & Davis
Attorneys

UNITED STATES PATENT OFFICE.

JAMES C. DALRYMPLE, OF CHARLESTON, SOUTH CAROLINA.

DEVICE FOR MEASURING STANDING TIMBER.

No. 855,759.  Specification of Letters Patent.  Patented June 4, 1907.

Application filed May 26, 1906. Serial No. 318,974.

*To all whom it may concern:*

Be it known that I, JAMES C. DALRYMPLE, a citizen of the United States of America, and a resident of Charleston, county of Charleston, State of South Carolina, have invented certain new and useful Improvements in Devices for Measuring Standing Timber, of which the following is a full and clear specification, reference being had to the accompanying drawings, in which—

Figures 1, 2, 3 and 4 are side views showing the four sides of the main staff of my device; Fig. 5 a side elevation showing the device in position for measuring the height of a tree trunk; Fig. 6 a view showing the device adjusted for measuring the diameter of a tree trunk; and Fig. 7 a detail view of the cross-bar or connection showing the pointer carried thereby in an elevated position, in which position it is adjusted when measuring the height of a tree trunk.

The object of this invention is to provide a simple and inexpensive and convenient mechanical device for estimating the volume of the available portion of standing timber.

In using my device I first obtain the height of the available portion of the trunk and then the diameter thereof, this last measurement, by means of a series of volume scales on the main staff, giving the volume in feet of boards of a predetermined width and thickness, as more fully hereinafter set forth.

The device is so constructed that it may be also used in the manner of a pair of dividers to measure off land, and also as a Jacob-staff for use in surveying, as more fully hereinafter set forth.

Referring to the drawing annexed by reference-characters, A designates the staff, which is rectangular in cross section and is shod at its earth-engaging end with a pointed ferrule D, and at its upper end it is provided with a series of holes $a^2$ whereby a compass may be conveniently attached thereto when the device is to be used as a Jacob-staff. I prefer that the staff shall have a length of five feet although it may be longer if desired. With a staff five feet in length, from a point sixteen inches below the head down to the ferrule D, each of the four sides of the staff is marked off by transverse lines into inches, the corresponding lines on the several sides being exactly coincident. Down through the center of each side of the staff is run a dividing line $a^3$ which divides each of the scales thereon in half thereby making two scales on each side or eight scales in all.

The scales marked off on each side of the staff are volume scales, the two on the side shown in Fig. 1 being respectively for trunks having a height of sixteen and twenty-four feet, the two shown in Fig. 2 for trunks having respective heights of thirty-two and forty feet, the two in Fig. 3 respectively for trunks having heights of forty-eight and fifty-six feet, and the remaining two shown in Fig. 4 being respectively for heights of sixty-four and seventy-two feet. These scales will be plotted in the usual manner, they being the standard log rules with the necessary deductions for bark and taper of trees.

Instead of dividing the side shown in Fig. 2 by a longitudinal line $a^3$ I form a longitudinal recess therein, this recess beginning at a point four inches below the top of the staff and extending to the shoe D, and in this groove I pivot, at its upper end $a$, a prop B which may be folded into the slot and swung out of the same in the manner of a pocket knife. This prop fits snugly into its recess, and a suitable device is employed to hold it therein when it is not opened out for use. This prop is made narrow as shown in order that ample space will be left for the figures of the volume scales.

Detachably connecting the staff and the prop is a brace or cross-bar C which is attached to the staff and prop by means of removable pins $x$ and $x'$ passed through holes $c'$ in the cross-bar and into holes $a'$ and $b'$ in the staff and prop respectively. This cross-bar may fold into the staff with the prop, as shown in Fig. 2, or when the prop is folded it may be detached therefrom and folded against one side of the staff where it may be held in any suitable manner. This cross-bar is attached to the staff and prop at such a point that it will limit the spread thereof to three feet at their earth-engaging points. This will enable the device when opened out as shown in Fig. 5 to be used in the manner of a pair of dividers to measure off distances on land. The main purpose of this cross-bar, however, is to support a pointer or sight bar $c$ which normally rests upon the upper edge of the cross-bar and is hinged thereto at a point near the staff, its other end being free to be raised and lowered with respect to the cross-bar, this free end of the pointer working over a height scale on the prop above the cross-bar.

To obtain the correct height of the available portion of a standing tree trunk, the device, adjusted as shown in Fig. 5, is placed on the ground at a predetermined distance from the tree to be measured. With a staff of the dimensions I have described, the proper distance will be forty-four yards, but the elevation may be taken at a point twenty-two yards from the tree but in this case the result obtained will have to be divided by two. When the device is properly located it is adjusted so that the upper straight edge of the pointer $c$ while lying on the cross-bar shall point at the stump or place where the tree is to be cut off. Then the pointer is raised until its upper end is in alinement with the upper end of the available part of the trunk, which point is just below the first limb. The height scale will then give approximately the height of the available part of the trunk.

In order to hold the pointer at the adjusted position until the scale can be carefully read, I provide a series of small holes $b^2$ in the scale whereby a nail or pin may be inserted under the pointer to hold it in position temporarily.

After the height of the trunk is obtained, the prop is swung out to a position at right angles to the staff and is held in that position by the cross-bar, the cross-bar being provided with another hole $c'$ near its outer end which is adapted to register with a hole $b$ when the prop is thus adjusted to a right angle position. With the prop in this position the device is applied to the tree trunk as shown in Fig. 6, when the volume of the tree trunk in boards may be obtained by running the eye along the volume scale on the staff until the line thereon is found which is in alinement with the surface of the trunk at a point directly opposite the point where the prop B makes contact with the trunk. For instance, if the trunk be sixteen feet in height the volume will be ascertained on the sixteen foot scale, if twenty-four feet in height the volume will be obtained on the twenty-four foot scale, and so on. In the example shown in Fig. 6, if the tree trunk be sixteen feet in height the contents will be nine hundred feet in planks of a predetermined thickness and width, and if twenty-four feet in height the contents will be twelve hundred and ninety-two feet in planks.

When the device is adjusted as shown in Fig. 6, the cross-bar may be adjusted as shown in dotted lines, instead of as shown in full lines, but I prefer the adjustment shown in full lines as that adjustment involves only the removal of the pin $x'$.

The outer edge of the prop will also be bound with thin brass the edges extending over about one thirty-second of an inch. The prop will be made a little smaller than the groove thereby preventing it from sticking or hanging during damp weather, when all wood swells more or less. The brass binding will therefore cover these small cracks and also furnish a finger hold for pulling the prop out of the slot or groove.

If desired, the prop may be provided on its other side with another height scale adapted for a shorter distance from the tree, say twenty-two yards or one half the distance of the scale hereinbefore described. It will be understood that in using my device for estimating the contents of a forest it will not be usually necessary to measure every tree individually, as a few average trees may be picked out and measured and the total may then be obtained by multiplying the average tree contents thus obtained by the number of trees in the forest. In this way it will be unnecessary to again measure the heights until a change in the average heights is noticeable.

Having thus fully described my invention, what I claim and desire to secure by Letters Patent is:—

1. In combination, a staff provided with a series of volume scales, a prop pivoted thereto and provided with a height scale, a cross-bar connecting the prop and the staff and carrying a sighting bar whose free end works over the height scale, for the purposes set forth.

2 In a device of the class set forth, the combination of a pair of supporting members one a staff having volume scales on it and the other a prop, the two members being pivotally connected together at their upper ends, a cross-bar pivotally connecting the two members, one of the connections being detachable and one of the members being provided with a supplemental hole for engagement with the said detachable end of the cross-bar, a sighting bar carried by the cross-bar and a height scale adapted to work in conjunction with the sighting bar.

In testimony whereof I hereunto affix my signature in the presence of two witnesses this 23 day of May, 1906.

J. C. DALRYMPLE.

Witnesses:
   ALBERT BUFORD,
   HOWARD WISWALL, Jr.